Patented Mar. 2, 1948

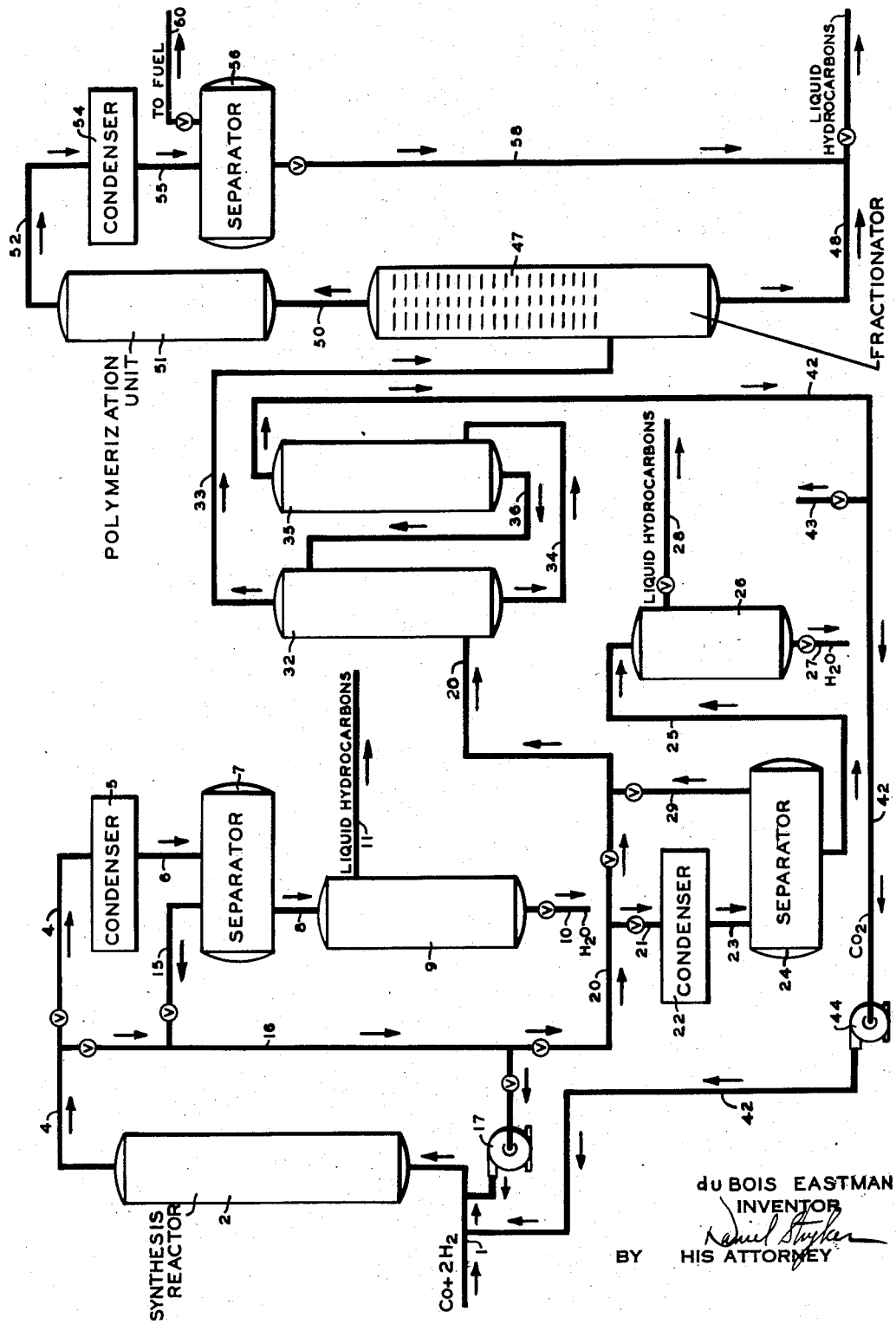

2,436,957

UNITED STATES PATENT OFFICE 2,436,957

CATALYTIC SYNTHESIS OF HYDROCARBONS WITH CONTROLLED RECYCLE OF CARBON DIOXIDE

Du Bois Eastman, Scarsdale, N. Y., assignor to The Texas Company, New York, N. Y., a corporation of Delaware Application December 20, 1945, Serial No. 636,226

8 Claims. (Cl. 260—449.6)

This invention relates to the catalytic conversion of carbon monoxide and hydrogen into hydrocarbons, oxygenated hydrocarbons and the like.

The invention contemplates catalytically converting a mixture of carbon monoxide and hydrogen in a reaction zone, under suitable conditions of temperature and pressure, into hydrocarbons, oxygenated hydrocarbons and the like. The effluent from the reaction zone, which comprises normally gaseous and normally liquid hydrocarbons, steam, carbon dioxide, unreacted carbon monoxide and hydrogen, is separated into gaseous and normally liquid components through conventional means. The gaseous components comprising both paraffinic and olefinic hydrocarbons, carbon dioxide, carbon monoxide and hydrogen, are divided into a minor portion and a major portion. The major portion is recycled directly to the reaction zone wherein the catalytic conversion of carbon monoxide and hydrogen takes place. Carbon dioxide is stripped from the minor stream which constitutes approximately the net production of gaseous reaction products and is then recycled directly, at least in part, to the reaction zone. The olefin content of the carbon dioxide-stripped minor stream is polymerized to increase the yield of liquid hydrocarbons.

In accordance with this invention, the reactor feed comprises about 1 to 4 volumes of recycle per volume of fresh feed. Thus the reactor feed comprises about 50 to 80% recycle gas. The total recycle is made up of two components. The major component is a gaseous stream comprising carbon dioxide, carbon monoxide, hydrogen and gaseous paraffinic and olefinic hydrocarbons including some gasoline hydrocarbons. The minor portion comprises almost pure carbon dioxide which is stripped from the total net production of gaseous reaction products which is continuously separated from the total gaseous effluent.

The portion of the pure carbon dioxide which is included in the recycle is regulated so that the total reactor feed introduced into the reaction zone contains from about 15 to 30% carbon dioxide.

It is advantageous to regulate the composition of the reactant mixture passing to the reaction zone or to each reaction stage of a multiple reaction zone so that the ratio of mols of hydrogen to mols of carbon monoxide plus carbon dioxide is not greater than 1, and preferably not less than 0.6. In addition, it is desirable that the molar ratio $$\frac{CO_2(H_2-2COA)}{CO \times H_2O}$$

of reactants passing to the reaction zone or to each stage thereof is substantially greater than the numerical value of the equilibrium constant for the water gas-shift reaction $$(CO+H_2O=CO_2+H_2)$$

at the temperature prevailing in the reaction zone where "A" is the fraction of carbon monoxide which will be converted in the zone or stage thereof and which fraction may range from 0.95 to 0.995.

The equilibrium constant for $$\frac{CO_2 \times H_2}{CO \times H_2O}$$

has a value of about 16 for a reaction temperature of 700° F.; a value of about 31 for a reaction temperature of 600° F. and a value of about 70 for a reaction temperature of 500° F. Thus, when the reactants are subjected to contact with a catalyst comprising iron powder in a state of dense phase fluidization at a temperature of about 600° F. this second molar ratio is advantageously maintained at least in the range of 60 and above, and preferably in the range about 100 to 160.

Many advantages accrue from employing the method of recycle as disclosed in this invention in the catalytic conversion of carbon monoxide and hydrogen into hydrocarbons, oxygenated hydrocarbons and the like.

First, a feasible method is provided for maintaining the carbon dioxide concentration at the desired level.

Secondly, since carbon dioxide is stripped only from the net production of gaseous products, there is avoided the necessity of employing an excessively large carbon dioxide absorbing unit. It is feasible to use a moderate size carbon dioxide absorption unit to strip the carbon dioxide from the net production of gaseous reaction products.

Thirdly, the polymerization of the olefin content of the total net production of gaseous products provides means of obtaining the maximum yield of liquid hydrocarbons.

Fourthly, the diluents such as paraffin hydrocarbons, carbon monoxide and hydrogen present in the gaseous products which are combined with the gaseous olefins which are polymerized improve the polymerization process and enable one to direct the polymerization towards the formation mainly of dimers and trimers.

Fifthly, the condensation whereby the liquid components are removed from the effluent from the catalytic conversion cools the gas recycle stream so that a cool recycle is provided which aids in the maintenance of close temperature control in the reaction zone.

In order that the invention may be more aptly described and fully understood, reference will now be made to the accompanying drawing wherein a flow diagram of the process of the invention is presented.

Synthesis gas, comprising carbon monoxide and hydrogen in the desired molecular ratio which may vary from 1:1 to 1:4, but is usually about 1:2, is obtained from a source not shown and passes through a pipe 1 through which it is introduced into a synthesis reactor 2. The synthesis gas which is obtained through the pipe 1 is known as fresh feed.

This fresh feed may be obtained from various sources. The controlled oxidation of methane with oxygen and the reaction of steam with coke illustrate two methods of obtaining carbon monoxide and hydrogen.

The reactor 2 is adapted to a fluidized catalyst type of conversion. In this type of conversion, the catalyst is maintained in a state of dense phase fluidization by correlating the particle size and density of the catalyst with the density and velocity at which the reactants pass through the conversion zone. An example of a catalyst that may be employed in this type of conversion for the hydrogenation of carbon monoxide is iron powder of about 100 to 400 mesh containing 1 to 2% potassium oxide and 2 to 3% alumina as promoters. Other promoters such as thoria and magnesia may also be employed. It is also feasible to use supported catalysts.

In the reactor 2, the synthesis gas is converted into hydrocarbon products which comprise both gaseous and liquid hydrocarbons of paraffin and olefin base. The temperature employed varies with the catalyst. Pressures ranging from atmospheric to about 1000 pounds per square inch gauge may be used. There is likewise formed in the catalytic conversion steam and carbon dioxide.

The reaction products, together with unreacted carbon monoxide and hydrogen and any diluent such as nitrogen which may be present, leave the reactor 2 through a pipe 4. This effluent, comprising normally gaseous and liquid hydrocarbons, carbon dioxide, hydrogen, carbon monoxide and perhaps some nitrogen, passes along the pipe 4 until it is introduced into a condenser 5.

In the condenser 5, steam and normally liquid hydrocarbons present in the effluent are condensed. After condensation of the liquid components, the total effluent flows from the condenser 5 through a pipe 6 and is introduced into a separator 7.

In the separator 7, the gaseous constituents of the effluent are separated from the condensed normally liquid components. The condensed liquid fraction leaves the separator 7 through a pipe 8 and flows into a decanter 9. The water present in the condensed fraction is separated from the liquid hydrocarbons in the decanter 9 and is discharged through a pipe 10. The liquid hydrocarbons from which water has been separated leave the decanter 9 through a pipe 11.

The liquid hydrocarbon fraction which flows along the pipe 11 may be subjected to further treatment such as fractionation, isomerization, cracking, reforming, etc.

The gaseous components of the effluent comprising carbon dioxide, carbon monoxide, hydrogen and paraffinic and olefinic hydrocarbons which are mainly $C_2$'s to $C_5$'s but whose upper component may range from a $C_6$ to $C_{10}$ hydrocarbon, depending upon the efficiency of the condenser 5, leave the gas-liquid separator 7 through a pipe 15 through which they are introduced into a pipe 16. The gases flow along the pipe 16 until they reach a Y branch at which the gases are divided into a major portion and into a minor portion.

The major portion proceeds along the pipe 16 and is recycled directly to the reactor 2 in which the catalytic conversion takes place. A blower 17 inserted in the pipe 16 is used to raise the recycle stream to the desired pressure prior to its entry into the pipe 1 which serves as the feed pipe for the reactor 2. This recycle stream, comprising mainly carbon dioxide and gaseous paraffinic and olefinic hydrocarbons, along with minor quantities of nitrogen, carbon monoxide and hydrogen, combines with fresh feed in the line 1 prior to introduction into the reactor 2.

The minor stream is diverted along a branch pipe 20 and is introduced into a carbon dioxide absorbing tower 32. The minor stream is approximately equivalent to the total net production of gaseous reaction products formed in the reactor 2. The carbon dioxide is absorbed as the minor stream flows counter current to a solution of an absorbent such as monoethanolamine. The gas from which the carbon dioxide has been stripped leaves the absorbing tower 32 through a pipe 33. This gas comprises gaseous paraffinic and olefinic hydrocarbons, hydrogen, carbon monoxide and some nitrogen. The further treatment of this gas will be described in detail later.

The solution of absorbent saturated with carbon dioxide continuously leaves the absorber 32 through a pipe 34 and is introduced into a stripper 35. In the stripper 35 the absorbent solution is regenerated, thereby liberating carbon dioxide. The regenerated absorbent solution leaves the stripper 35 through a pipe 36 through which it is returned to the absorber 32 for further use as an absorbing medium.

The liberated carbon dioxide leaves the stripper 35 through a pipe 42. There is inserted in the pipe 42 a vent 43 through which any carbon dioxide which is not to be returned to the reactor 2 may be discharged. There is also inserted in the pipe 42 a blower 44 in which the carbon dioxide is raised to the desired pressure prior to its return to the reactor 2. The quantity of carbon dioxide desired for recycle proceeds along the pipe 42 and is introduced into the pipe 1 which serves as the feed line for the reactor 2. The carbon dioxide combines with the fresh feed and the major recycle stream in the line 1 prior to introduction into the reactor 2. By recycling carbon dioxide in this fashion, it is possible to maintain the desired concentration of carbon dioxide in the reactor feed as has been described previously.

Thus, the total recycle is made up of two components: the major portion comprises carbon dioxide, gaseous paraffinic and olefinic hydrocarbons, nitrogen and unreacted carbon monoxide and hydrogen; the minor stream comprises almost pure carbon dioxide. The total reactor feed contains recycle and fresh feed in the ratio of about 1 to 4 parts of recycle to one part of fresh feed. By adjusting the quantities of the two recycle streams, the total percentage of carbon dioxide in the reactor feed is maintained within the limits of about 15 to 30%, depending upon the type of operation, the temperature and the catalyst that is employed in the reactor 2.

The gases from which carbon dioxide has been stripped in the absorbing tower 32 and which leave therefrom through the pipe 33 comprise mainly gaseous paraffinic and olefinic hydrocarbons, carbon monoxide, hydrogen and nitrogen. They are introduced into a fractionator 47 through the pipe 33. In the fractionator 47, a gasoline fraction, namely the $C_5$'s to $C_{10}$'s which are present in the gases, is condensed and separated from the gaseous stream. These condensed hydrocarbons are withdrawn from the fractionator 47 through a pipe 48 and are later combined with liquid hydrocarbons which are formed by a polymerization process which will be described.

The gases from which the gasoline hydrocarbons in the range of the $C_5$'s to $C_{10}$'s have been removed leave the fractionator 47 through a pipe 50. These gases now comprise carbon monoxide, hydrogen and gaseous paraffinic and olefinic hydrocarbons in the range of $C_2$'s to $C_5$'s. This gaseous stream passes along the pipe 50 and is introduced into a polymerization unit 51.

In the polymerization unit 51, the olefin content of the gaseous stream is polymerized to form liquid hydrocarbons. A suitable catalyst, such as phosphoric acid on silica, is employed to catalyze the polymerization. By proper control of the reaction conditions, it is possible to direct this polymerization mainly towards dimer and trimer formation. The presence of diluents such as carbon monoxide, hydrogen and gaseous paraffins improves the polymerization and facilitates the directing of the process towards the formation of dimers and trimers.

The effluent which leaves the polymerization unit 51 through a pipe 52 contains polymerized olefins and the constituents enumerated above as diluents. The effluent passes along the pipe 52 and is introduced into a condenser 54 in which the polymerized olefins are condensed. From the condenser 54, the total effluent flows into a gas-liquid separator 56 through a pipe 55. In the separator 56, the liquid hydrocarbons which have been formed by the polymerization of the gaseous olefins produced in the catalytic conversion are separated from the gaseous components of the effluent and are discharged through a pipe 58.

These liquid hydrocarbons formed by polymerization flow along the pipe 58 and combine with the gasoline hydrocarbons which have been separated in the fractionator 47 from the net production of gaseous reaction products. The combined liquid hydrocarbon fractions, both of which are mainly in the gasoline range, may be piped to storage through the pipe 48 or may be subjected to further treatment, such as isomerization, to improve their quality.

The gases which are separated from the liquid hydrocarbons formed by polymerization in the separator 56 leave the same through a pipe 60. The composition of this gaseous stream may be described as follows: mainly hydrogen and normally gaseous paraffin hydrocarbons and smaller portions of carbon monoxide and nitrogen. This gaseous stream may be used directly as fuel or may be passed to an absorption system, not shown, for the separation of such valuable paraffin hydrocarbons as butane, which may be later used in an alkylation process.

An alternative recycle procedure which may be characterized as a "hot" recycle is included within the concept of the invention. In this instance, the effluent which leaves the reactor 2 through a pipe 4 is not passed through a condensation and separation system to separate out water and liquid hydrocarbons, but is directly recycled without cooling to the reactor 2. Hence the name "hot" recycle.

In this type of operation, the recycle stream comprises a portion of the total hydrocarbon product containing normally gaseous and normally liquid components, carbon dioxide, carbon monoxide, hydrogen and steam. The total products of the reaction which are at an elevated temperature, proceed along the pipe 16 until they reach a Y whereat they are divided into a major and minor stream.

The major stream proceeds along the pipe 16 and is recycled directly to the reactor 2 at an elevated temperature. The blower 17, inserted in the line 16, serves to raise this stream to the desired pressure. This "hot" recycle combines with the fresh feed in the feed line 1 prior to entry into the reactor 2.

The minor stream is diverted from the pipe 16 along the pipe 20. In this type of operation, the minor stream constitutes the total net production of all the reaction products, both normally gaseous and normally liquid, formed in the reactor 2. Instead of proceeding directly along the pipe 20 to the carbon dioxide absorption tower 32, this recycle stream is diverted into a pipe 21 which leads into a condenser 22. In the condenser 22, steam and normally liquid hydrocarbons present in the stream are condensed. After condensation of the liquid components, both condensed and uncondensed components leave the condenser 22 through a pipe 23 and are introduced into a separator 24.

In the separator 24, the gaseous constituents of the total net production of both gaseous and liquid products are separated from the condensed normally liquid components. The condensed liquid fraction leaves the separator 24 through a pipe 25 and flows into a decanter 26. The water present in the condensed fraction is separated from the liquid hydrocarbons in the decanter 26 and is discharged through a pipe 27. The liquid hydrocarbons from which water has been separated leave the decanter 26 through a pipe 28. The further treatment of these liquid hydrocarbons is similar to that which has been outlined for the liquid hydrocarbons which leave the decanter 9 through the pipe 11 in the first described modification of the invention.

The gases which have been separated from the condensed liquid in the separator 24 and which comprise gaseous, paraffinic and olefinic hydrocarbons, carbon dioxide, carbon monoxide, hydrogen and nitrogen, leave the separator 24 through a pipe 29 and therethrough return to the pipe 20 which leads to the carbon dioxide absorbing tower 32. From this point on, the treatment of the gaseous stream is similar to that which has been described in detail in the first modification wherein what might be called a "cool" recycle is used.

The first described modification is the preferred modification because it provides a cool recycle stream which aids in regulating the temperature in the synthesis reactor, and also because water, whose presence fosters the formation of undesirable carbon dioxide in the reactor 2, is removed.

The method of recycle, as disclosed in this invention, is applicable to any type of catalytic conversion of carbon monoxide and hydrogen into hydrocarbons, oxygenated hydrocarbons and the like. The invention may be used with a fixed bed type of operation as with a fluid dense phase type of conversion. Moreover, the disclosed method of recycle works effectively with all the different catalysts.

The term "net production of gaseous reaction products," as used herein and in the present claims is intended to mean that quantity of the normally gaseous constituents produced in the reaction recovered from the reaction zone, in excess of those introduced in the total feed to the reactor. Obviously, therefore, the invention involves continual removal of the excess or net production of normally gaseous constituents from the system with return of carbon dioxide in a relatively pure stream to suppress such net production at a desirably low minimum.

Obviously, many modifications and variations of the invention, as hereinbefore set forth, may be made without departing from the spirit and scope thereof and, therefore, only such limitations should be imposed as are indicated in the appended claims.

I claim:

1. In the catalytic conversion of carbon monoxide and hydrogen into hydrocarbons, oxygenated hydrocarbons and the like, the method which comprises contacting a mixture of carbon monoxide and hydrogen with a catalyst in a reaction zone, effecting catalytic conversion of said carbon monoxide and hydrogen under suitable conditions of temperature and pressure into hydrocarbons, oxygenated hydrocarbons and the like, discharging from said reactor an effluent comprising normally gaseous and liquid hydrocarbons, carbon dioxide, unreacted carbon monoxide and hydrogen, separating the normally gaseous constituents of said effluent from the normally liquid hydrocarbons, dividing said gases into a major stream and a minor stream, the latter comprising the net production of gaseous reaction products, recycling said major stream to said reaction zone, separating carbon dioxide from said minor stream and recycling said carbon dioxide at least in part to said reaction zone.

2. The method according to claim 1 in which the major recycle stream contains gaseous paraffinic and olefinic hydrocarbons.

3. In the catalytic conversion of carbon monoxide and hydrogen into hydrocarbons, oxygenated hydrocarbons and the like, the method which comprises contacting a mixture of carbon monoxide and hydrogen with a catalyst in a reaction zone, effecting catalytic conversion of said carbon monoxide and hydrogen under suitable conditions of temperature and pressure into hydrocarbons, oxygenated hydrocarbons and the like, discharging from said reactor an effluent comprising normally gaseous and liquid hydrocarbons, carbon dioxide, unreacted carbon monoxide and hydrogen, separating the normally gaseous constituents of said effluent from the normally liquid hydrocarbons, dividing said gases into a major stream and a minor stream, the latter comprising the net production of gaseous reaction products, recycling said major stream to said reaction zone, separating carbon dioxide from said minor stream and recycling said carbon dioxide at least in part to said reaction zone, and maintaining in the reactor feed 1 to 4 volumes of recycled material, comprising said carbon dioxide and said major stream, per volume of fresh feed.

4. In the catalytic conversion of carbon monoxide and hydrogen into hydrocarbons, oxygenated hydrocarbons and the like, the method which comprises contacting a mixture of carbon monoxide and hydrogen with a catalyst in a reaction zone, effecting catalytic conversion of said carbon monoxide and hydrogen under suitable conditions of temperature and pressure into hydrocarbons, oxygenated hydrocarbons and the like, discharging from said reactor an effluent comprising normally gaseous and liquid hydrocarbons, carbon dioxide, unreacted carbon monoxide and hydrogen, separating the normally gaseous constituents of said effluent from the normally liquid hydrocarbons, dividing said gases into a major stream and a minor stream, the latter comprising the net production of gaseous reaction products, recycling said major stream to said reaction zone, separating carbon dioxide from said minor stream, recycling said carbon dioxide at least in part to said reaction zone, maintaining in the reactor feed 1 to 4 volumes of recycled material, comprising said carbon dioxide and said major stream, per volume of fresh feed and regulating the quantities of said recycle streams so that the content of carbon dioxide in the total reactor feed is maintained within the range of about 15 to 30%.

5. In the catalytic conversion of carbon monoxide and hydrogen into hydrocarbons, oxygenated hydrocarbons and the like, the method which comprises contacting a mixture of carbon monoxide and hydrogen with a catalyst in a reaction zone, effecting catalytic conversion of said carbon monoxide and hydrogen under suitable conditions of temperature and pressure into hydrocarbons, oxygenated hydrocarbons and the like, discharging from said reactor an effluent comprising normally gaseous and liquid hydrocarbons, carbon dioxide, unreacted carbon monoxide and hydrogen, dividing said effluent into a major stream and a minor stream, the latter comprising the total net production of reaction products, recycling said major stream to said reaction zone, condensing from the minor stream steam and normally liquid hydrocarbons, separating from the residual gases carbon dioxide and recycling said carbon dioxide at least in part to the reaction zone.

6. In the catalytic synthesis of hydrocarbons, oxygenated hydrocarbons and the like, by the reduction of carbon monoxide with hydrogen in a reaction zone under reaction conditions including an elevated temperature, wherein a fresh feed synthesis gas comprising substantial relative proportions of hydrogen and carbon monoxide is contacted with a synthesis catalyst effective under said reaction conditions, the improvement which comprises continuously withdrawing said reaction products from contact with said catalyst after substantial conversion to desired products, subjecting a minor proportion of the normally gaseous products of reaction at least equal in quantity to the net production of normally gaseous reaction products, to treatment for the recovery therefrom of contained carbon dioxide, recycling said carbon dioxide at least in part to said reaction zone and recycling the residual major portion of the normally gaseous products of reaction to the reactor in combination therewith.

7. In the catalytic synthesis of hydrocarbons, oxygenated hydrocarbons and the like, by the reduction of carbon monoxide with hydrogen in a reaction zone under reaction conditions including an elevated temperature, wherein a fresh feed synthesis gas comprising substantial relative proportions of hydrogen and carbon monoxide is contacted with a synthesis catalyst effective under said reaction conditions, the improvement which comprises continuously withdrawing said reaction products from contact with said catalyst, after substantial conversion to desired products, as an effluent stream comprising normally gaseous and normally liquid hydrocarbons, carbon dioxide, unreacted carbon monoxide and hydrogen, and water vapor, separating normally gaseous constituents of said effluent from normally liquid constituents, dividing said separated normally gaseous constituents into a minor stream, equal at least to the net production of gaseous reaction products, and a major stream, separating carbon dioxide from said minor stream, recycling said carbon dioxide at least in part to said reaction zone and recycling said major stream to said reaction zone in its substantial entirety.

8. The method as defined in claim 7 wherein the catalyst is an active iron catalyst and wherein the total reactor feed comprises about one to four volumes of recycle gas per volume of fresh feed synthesis gas.

DU BOIS EASTMAN.

REFERENCES CITED

The following references are of record in the file of this patent:

UNITED STATES PATENTS

| Number | Name | Date |
|---|---|---|
| 2,224,048 | Herbert | Dec. 3, 1940 |
| 2,248,099 | Linckh | July 8, 1941 |
| 2,257,293 | Dreyfus | Sept. 30, 1941 |
| 2,279,052 | Michael | Apr. 7, 1942 |
| 2,347,682 | Gunness | May 2, 1944 |